United States Patent

Kanehira et al.

[11] Patent Number: 5,941,059
[45] Date of Patent: Aug. 24, 1999

[54] SILENT CHAIN, AND ROCKER PIN AND PLATE THEREOF

[75] Inventors: Makoto Kanehira, Iruma; Masao Maruyama, Hanno; Hitoshi Ohara, Iruma; Masahiro Sato, Oita; Nobuyuki Fujimoto, Iruma; Takayuki Funamoto, Hanno, all of Japan

[73] Assignee: Tsubakimoto Chain Co., Osaka-fu, Japan

[21] Appl. No.: 08/955,242

[22] Filed: Oct. 21, 1997

[30] Foreign Application Priority Data

Oct. 21, 1996 [JP] Japan ................................. 8-277963

[51] Int. Cl.⁶ .......................... F16H 13/04; F16G 13/00
[52] U.S. Cl. ................................ 59/5; 474/215; 474/214
[58] Field of Search .............................. 59/4, 5; 474/214, 474/215, 216, 217, 229

[56] References Cited

U.S. PATENT DOCUMENTS

| | | | |
|---|---|---|---|
| 4,507,106 | 3/1985 | Cole, Jr. ................................. | 474/215 |
| 4,801,289 | 1/1989 | Sugimoto et al. . | |
| 4,904,231 | 2/1990 | Zimmer . | |
| 5,026,331 | 6/1991 | Sugimoto et al. . | |
| 5,236,399 | 8/1993 | Sugimoto et al. . | |
| 5,242,333 | 9/1993 | Sugimoto et al. ..................... | 474/215 |
| 5,242,334 | 9/1993 | Sugimoto et al. . | |
| 5,372,554 | 12/1994 | Okuda .................................... | 474/215 |
| 5,419,743 | 5/1995 | Takeda et al. ......................... | 474/215 |
| 5,562,559 | 10/1996 | Kolhatkar ............................... | 474/229 |
| 5,651,746 | 7/1997 | Okuda .................................... | 474/215 |

FOREIGN PATENT DOCUMENTS

| | | | |
|---|---|---|---|
| 5-312238 | 11/1993 | Japan ..................................... | 474/215 |
| 6-159446 | 6/1994 | Japan ..................................... | 474/215 |
| 6-207643 | 7/1994 | Japan ..................................... | 474/215 |

Primary Examiner—David Jones
Attorney, Agent, or Firm—Armstrong, Westerman, Hattori, McLeland & Naughton

[57] ABSTRACT

A silent chain, as well as a rocker pin and a plate of the silent chain, are provided which are capable of enhancing the transmission efficiency, and improving the fatigue strength of the plate to thereby prolong the service life of the silent chain. Rocker pins are inserted into the pin holes of each plate of a plurality of plates of a silent chain. The rocker pins are located closer to outer ends of the plate and are formed with generally flat plate abutting surfaces. The plate abutting surfaces are received by generally flat pin seating surfaces of the pin holes, respectively, to surely prevent rotation of the rocker pins relative to the pin holes. Further, in addition to the generally flat pin seating surfaces, generally flat and short continuous surfaces are formed centrally up and down of each pin hole. Thus, stress concentration on the plate is diminished and the fatigue strength of the plate is improved.

2 Claims, 4 Drawing Sheets

SILENT CHAIN, AND ROCKER PIN AND PLATE THEREOF

TECHNICAL FIELD OF THE INVENTION

The present invention generally relates to a silent chain, as well as a rocker pin and a plate of the silent chain and more particularly, to an improvement in the shape of pin holes formed in each plate of a silent chain and in the shape of rocker pins inserted in each of the pin holes.

BACKGROUND OF THE INVENTION

As shown in FIGS. 4 or 5, a conventional silent chain 1 is composed of a large number of plates 4' which are connected together in an endless fashion. The plates 4' are also connected together bendably through plural sets of rocker pins 2' and 3' with each set being constituted by two rocker pins. Teeth of a sprocket 5 come into engagement with engaging surfaces of the plates 4' to perform the transmission of power between the sprocket 5 and another sprocket (not shown). The plates 4' are arranged in many rows in the transverse direction of the silent chain 1 in such a manner that the plates, which are adjacent to each other back and forth in the traveling direction of the silent chain 1, are sandwiched alternately in the transverse direction.

Of the two rocker pins 2' and 3' which constitute each set, one rocker pin 2' is longer than the other rocker pin 3'. An end of each rocker pin 2', 3' is fitted in non-circular pin holes formed in plates 4'A. The plates 4'A are arranged adjacent both outsides of the plural, transversely arranged plates 4' and are guided by side faces of the teeth of the sprocket 5.

FIG. 6 a side view of each plate 4' and a pair of rocker pins 2' and 3' are inserted into each of the pin holes 6' and 7' through the plate 4'. The rocker pins 2' and 3' have the same cross-sectional shape and are inserted into each of the pin holes 6' and 7' so as to be opposed to each other so that the rocker surfaces 2'B and 3'B of the rocker pins 2', 3', respectively, are adjacent to each other.

The rocker pins 2' inserted into the pin holes 6' and 7', and located closer to the outer end of the plate 4', have respective concavely arcuate plate abutting surfaces 2'A formed on the side opposite to their rocker surface 2'B. The plate abutting surfaces 2'A come into engagement with convexly arcuate pin seating surfaces 6'A and 7'A and are thereby prevented from rotating. The inner peripheral portions, other than the pin seating surfaces 6'A and 7'A of the pin holes 6' and 7', are each formed by a simple concavely arcuate surface.

On the other hand, the rocker pins 3', inserted into the pin holes 6' and 7' and located closer to the center of the plate 4', are each engaged at a plate abutting surface 3'A thereof with pin seating surfaces 6'A and 7'A of a pin holes 6', 7' formed in a longitudinally adjacent plate (not shown).

As shown in FIG. 4, when the silent chain 1 is entrained on the sprocket 5 and a tensile force is exerted between front and rear plates, the rocker surface 2'B of the rocker pin 2' and the rocker surfaces 3'B of the rocker pin 3' are pressed against each other to effect transfer of the tensile force.

Since the opposed rocker surfaces 2'B and 3'B are each formed in a convexly arcuate shape, it becomes possible to perform a relative rocking motion between the rocker pins 2' and 3', thus permitting bending between longitudinally adjacent plates. As shown in FIG. 6, a lower edge 8' of the plate 4' is bifurcated for engagement with the sprocket teeth, while an upper edge 9' thereof is formed as a flat surface.

In the conventional silent chain constructed as described above, the convexly arcuate pin seating surfaces 6'A, 7'A of each of the pin holes 6', 7' of the plate 4' and the concavely arcuate plate abutting surfaces 2'A, 3'A of the associated rocker pins 2', 3', respectively, which is closer to the outside of the plate 4', are brought into engagement with each other to prevent the rotation of the rocker pin 2', 3' relative to the plate 4'. Therefore, the area of contact between the pin seating surface 6'A, 7'A and the plate abutting surface 2'A, 3'A is small, with the result that while the silent chain is in use, the rocker pin 2', 3' closer to the outside of the plate 4' is apt to wobble within the pin hole 6', 7' of the plate 4'. This has so far been a cause of power loss during travel of the silent chain.

Further, when a tensile force is exerted between adjacent plates during use of the silent chain, each pin hole is elastically deformed in an elliptical shape longitudinally and microscopically. In this case, at both circumferential ends of the pin seating surface which is formed in a convexly arcuate shape, the contour of the inner peripheral surface of the pin hole is suddenly transformed into a concavely arcuate shape. Consequently, stress is concentrated on both end portions. Stress concentration occurs also at the central, upper and lower portions of the inner peripheral surface of each pin hole and at the inwardly recessed portion of each plate, so that the plate is likely to be cracked and broken from those portions due to metal fatigue.

Accordingly, it is an object of the present invention to solve the above-mentioned problems of the prior art and provide a silent chain, as well as a rocker pin and plate thereof, capable of enhancing the transmission efficiency and improving the fatigue strength of the plate to prolong the service life of the chain.

SUMMARY OF THE INVENTION

According to the present invention, in order to achieve the above-mentioned object, a silent chain is provided having a multitude of plates. Each plate has two pin holes and is also provided with rocker pins. The rocker pins are inserted in a pair into each pin hole of each plate in such a manner that convex arcuate rocker surfaces of the paired rocker pins are adjacent to each other to bendably interconnect the plates. Each of the rocker pins has a substantially flat plate abutting surface on the side opposite to the rocker surface thereof. Both circumferential ends of the plate abutting surface and both peripheral ends of the rocker surface are respectively interconnected through convexly arcuate surfaces. A concavely arcuate surface, which permits a rocking motion of the associated rocker pin, is formed at a portion of the inner peripheral surface of each pin hole. The portion of the inner peripheral surface of each pin hole is opposed to the rocker pin which is closer to the center of the plate that the rocker pins are inserted into each of the pin holes thereof. A substantially flat pin seating surface is formed in each of the pin holes at a portion of the pin hole opposed to the rocker pin which is closer to the plate outside of the rocker pins inserted into each of the pin holes. The pin seating surface comes into abutment with the plate abutting surface of the rocker pin to prevent the rotation of the rocker pin. On both sides in the circumferential direction of the pin seating surface are formed concavely arcuate surfaces conforming to the concavely arcuate surfaces of the rocker pin which is closer to the outside of the plate. The concavely arcuate surface are connected to the concavely arcuate surfaces opposed to the rocker pins which are closer to the center of the plates by a short, substantially flat connection surface.

According to the present invention, a rocker pin of a silent chain is provided which is inserted in a pair into each of pin holes formed in each plate in such a manner that convexly arcuate rocker surfaces of the paired rocker pins are adjacent to each other. A substantially flat plate abutting surface is formed on the side opposite to the rocker surface of each rocker pin, and the plate abutting surface and both circumferential ends of the rocker surface of each rocker pin are respectively interconnected through convexly arcuate surfaces.

According to the present invention, a plate of a silent chain is provided which has two pin holes. Two rocker pins are inserted into each of the pin holes in such a manner that respective convexly arcuate rocker surfaces are adjacent to each other. A concavely arcuate surface permitting a rocking motion of the associated rocker pin is formed at a portion of the inner peripheral surface of each pin hole. The portion of the inner peripheral surface of each pin hole is opposed to the rocker pin which is closer to the center of the plate of the rocker pins inserted into each pin hole. A substantially flat pin seating surface is formed in each of the pin holes at a portion of the pin hole which is opposed to the rocker pin closer to the outside plate of the rocker pins inserted into each of the pin holes. The pin seating surface comes into abutment with the associated rocker pin to prevent the rocking motion of the rocker pin. On both sides in the circumferential direction of the pin seating surface are formed concavely arcuate surfaces conforming to the rocker pin closer to the outside of the plate. The concavely arcuate surfaces are connected to the concavely arcuate surface opposed to the rocker pins closer to the centers of the plate by a short, substantially flat connection surface.

When a pair of rocker pins are inserted into each pin hole formed in each plate in such a manner that the respective rocker surfaces are adjacent to each other to connect longitudinally adjacent plates with each other, the generally flat plate abutting surface of the rocker pin located closer to the outside of the plate and the generally flat pin seating surface of the pin hole come into abutment with each other over a wide area. Further, the convexly arcuate surfaces formed on both circumferential sides of the plate abutting surface of the rocker pin and the concavely arcuate surfaces formed on both circumferential sides of the pin seating surface come into abutment with each other, so that the rotation and wobbling of the rocker pin relative to the plate pin hole are surely prevented.

Moreover, since the pin seating surface of each pin hole with which the rocker pin closer to the outside of the plate comes into abutment is formed as a generally flat surface, stress concentration is diminished on the portions contiguous from both circumferential ends of the pin seating surface to the concavely arcuate surfaces formed on both sides of the end portions. Further, since the concavely arcuate surfaces are connected to the concavely arcuate surfaces opposed to the rocker pins located closer to the center of the plates by short, generally flat continuous surfaces, stress concentration is diminished on the central, upper and lower portions of the inner periphery of each pin hole and on the inwardly recessed portion of each plate.

BRIEF DESCRIPTION OF THE DRAWING FIGURES

DETAILED DESCRIPTION OF THE INVENTION

Figure 1:
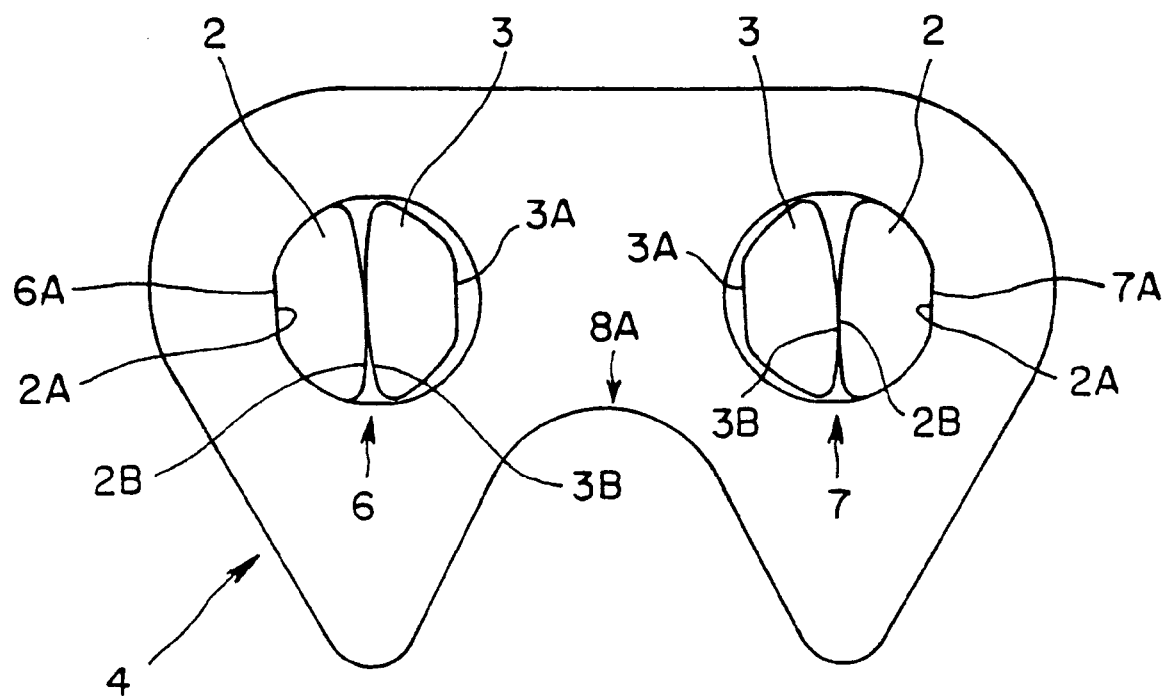
FIG. 1 is a side view of a plate with rocker pins inserted therein, showing an embodiment of the present invention.
Figure 6:
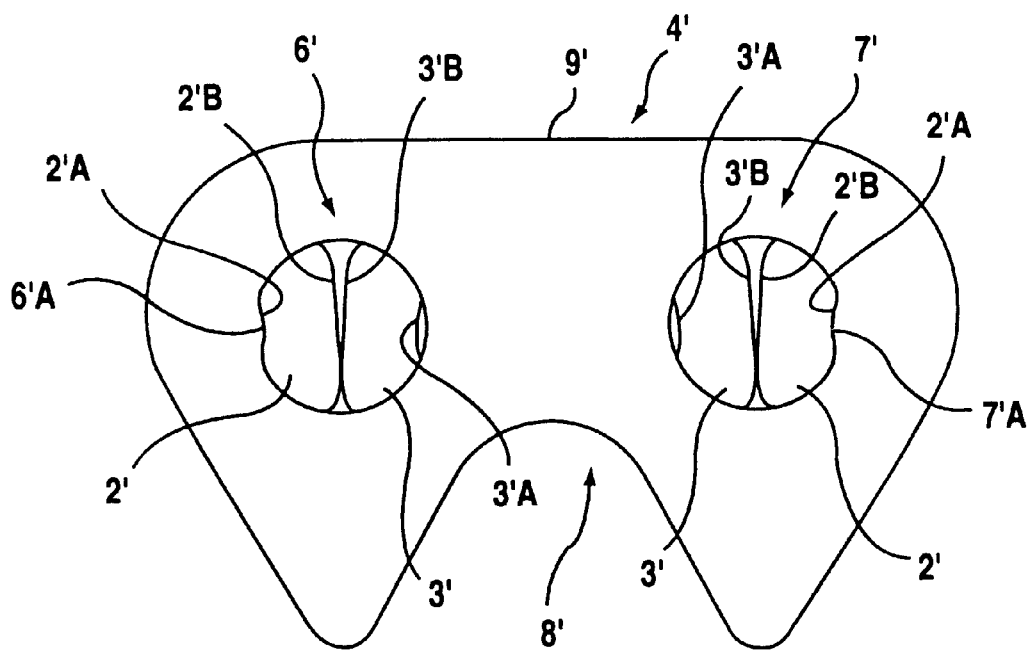
FIG. 6 is a side view of a plate with rocker pins inserted therein according to the prior art.

An embodiment of the present invention will be described below with reference to the drawing figures. FIG. 1 is a side view of an embodiment of the present invention showing a plate of a silent chain having rocker pins inserted therein. An external contour of the plate, indicated at 4, is the same as that of the conventional plate 4' shown in FIG. 6.

As shown in FIG. 1, two rocker pins 2 and 3 are inserted in each of two pin holes 6 and 7 formed in the plate 4. A large number of such plates 4 are connected in an endless fashion to constitute a silent chain.

The rocker pins 2 and 3 are inserted into each of the pin holes 6 and 7 in such a manner that respective convexly arcuate rocker surfaces 2B and 3B are adjacent to each other. When such plates 4 are assembled and used as a silent chain, the rocker pin 3 which is located closer to the center of each plate 4 is pressed at its rocker surface 3B against the rocker surface 2B of the rocker pin 2 located closer to the outer end of the plate 4 and opposed thereto by virtue of a tensile force exerted from a longitudinally adjacent plate (not shown).

Since the rocker surfaces 2B and 3B of the rocker pins 2 and 3, respectively, are each formed in a convexly arcuate shape, the rocker surfaces 2B, 3B permit a relative rocking motion between the rocker pins 2 and 3 within a predetermined angular range, thereby making a bending motion possible between the plate that the rocker pins 2, 3 are inserted into and other plates connected thereto longitudinally.

Figure 2:
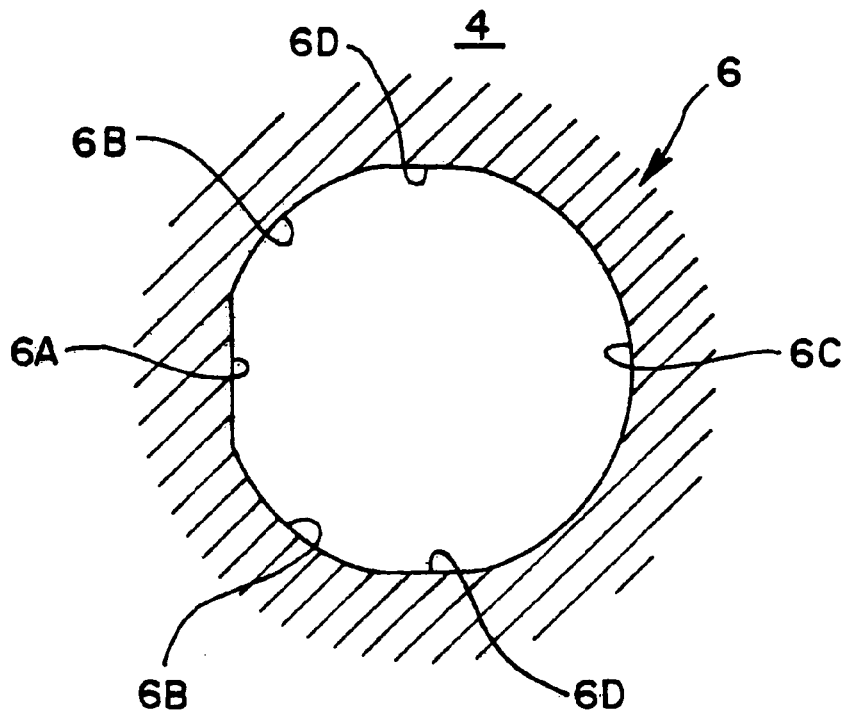
FIG. 2 is a diagram showing the shape of a pin hole formed in the plate according to the embodiment of FIG. 1.

FIG. 2 is a diagram showing the shape of the pin hole 6. The outer pin hole 7, shown in FIG. 1, is of the same shape as the pin hole 6 except that it is formed symmetrically with respect to the center of the plate 4. Therefore, the shape of only the pin hole 6 will be described.

In FIG. 2 the pin hole 6 is formed with a flat pin seating surface 6A at the portion thereof which is closer to the outer end of the plate 4, and on both circumferential sides of the pin seating surface 6A are formed concavely arcuate surfaces 6B, 6B. At the portion of the pin hole 6 which is closer to the center of the plate 4, a concavely arcuate surface 6C is formed. The concavely arcuate surfaces 6B, 6B and the concavely arcuate surface 6C are respectively interconnected through flat and short continuous surfaces 6D, 6D.

Figure 3:
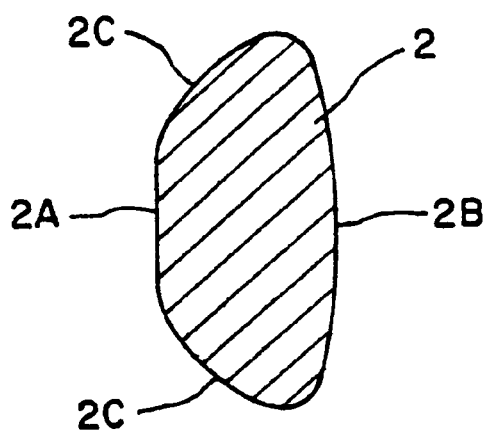
FIG. 3 is diagram showing a cross-sectional shape of a rocker pin according to the embodiment of FIG. 1.
Figure 4:
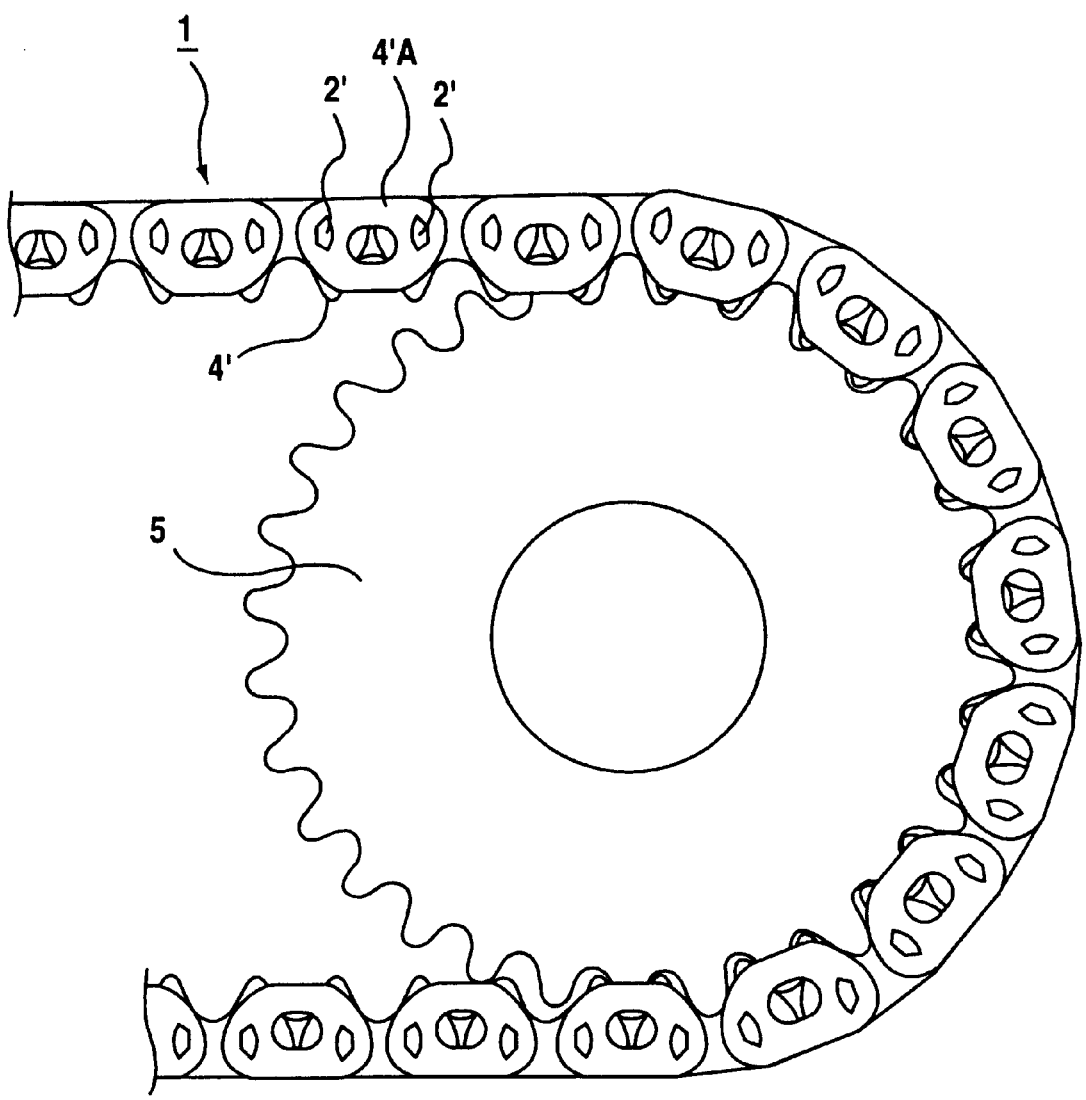
FIG. 4 is a partial side view showing an appearance of a conventional silent chain.
Figure 5:
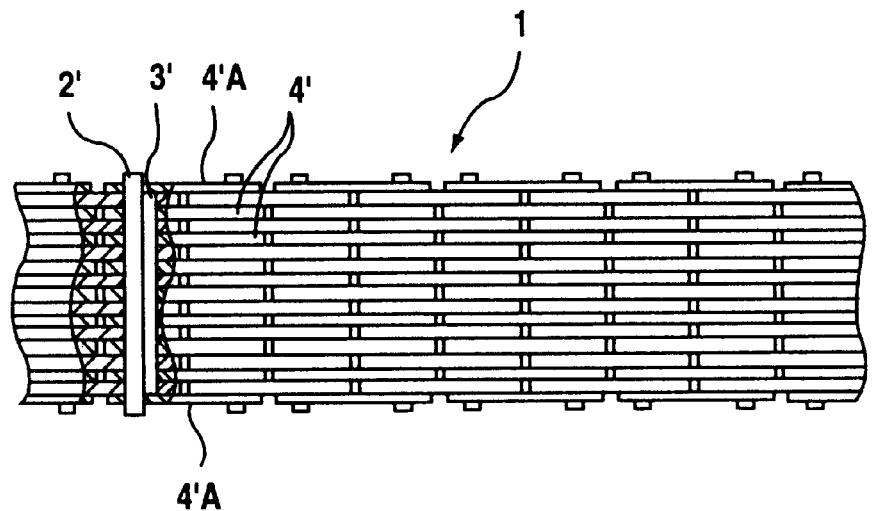
FIG. 5 is a partial plan view of the conventional silent chain.

FIG. 3 is a diagram showing a cross-sectional shape of one rocker pin 2. The other rocker pin 3, as the counterpart of the rocker pin 2 to be inserted together into one pin hole, is of the same cross-sectional shape as the rocker pin 2, but is merely used in the opposite direction, as shown in FIG. 1. Therefore, reference will here-in-after only be made to the shape of the rocker pin 2. The rocker pin 2, on the side opposite to the rocker surface 2B, has a flat plate abutting surface 2A for abutment with the pin seating surface 6A of the pin hole 6 shown in FIG. 2. The plate abutting surface 2A and both circumferential ends of the rocker surface 2B are respectively interconnected by convexly arcuate surfaces 2C, 2C. The convexly arcuate surfaces 2C, 2C are formed in a contour conforming to the concavely arcuate surfaces 6B, 6B of the pin hole 6 shown in FIG. 2.

A silent chain is assembled by combining a large number of the rocker pins 2, 3 and plates 4 constructed as above-described. When a tensile force is exerted longitudinally in the traveling direction for the silent chain at the time of power transmission, the flat plate abutting surfaces 2A of the rocker pins 2 which are closer to the outer ends of each plate 4 come into abutment with the flat pin seating surfaces 6A, 7A. Further, the convexly arcuate surfaces 2C, 2C formed on both circumferential sides of each plate abutting surface 2A, shown in FIGS. 2 and 3, come into abutment with the concavely arcuate surfaces 6B, 6B formed on both circumferential sides of the pin seating surface 6A to prevent the rotation of the plate 4 relative to the pin hole.

In this case, since the plate abutting surface 2A and the pin seating surface 6A come into abutment with each other over a flat and wide area, the rotation of the rocker pin 2 in the pin hole 6 is surely prevented. Furthermore, by the abutment of the convexly arcuate surfaces 2C, 2C with the concavely arcuate surfaces 6B, 6B, vertical wobbling of the rocker pin 2 relative to the plate 4 is also prevented in an auxiliary manner. This is also true of the rocker pin 2 which is on the same side of the plate 4 as the pin hole 7.

Like the rocker pin 2, the rocker pin 3 located face-to-face with the rocker pin 2 is also prevented from rotating relative to each pin hole of a plate (not shown) which is longitudinally adjacent to the plate 4 shown in FIG. 1 in the traveling direction of the silent chain.

As shown in FIG. 1, a slight clearance is formed between the peripheral surface on the side of the plate abutting surface 3A of the rocker pin 3, which is inserted into each of the pin holes 6 and 7 and which is closer to the center of the plate 4, and the concavely arcuate surface of each of the pin holes 6 and 7 being closer to the center of the plate 4. Thus, a rocking motion of the rocker pin 3 within the pin hole 6, 7 is permitted.

As shown in FIG. 2, moreover, since the flat and short continuous surfaces 6D, 6D are present centrally up and down of the inner peripheral surface of the pin hole 6, stress concentration on the upper and lower central portions of the inner peripheral surface of the pin hole 6 is diminished upon exertion of a longitudinal tensile force on the plate 4, and stress concentration is also diminished on the inwardly recessed portion 8A at the lower edge center of the plate 4 shown in FIG. 1. This is also the case with the pin hole 7, though explanation is omitted.

Although in the above-described embodiment of the plate abutting surface of each rocker pin, the pin seating surface of each pin hole formed in each plate to bear the plate abutting surface, and the short continuous surfaces formed centrally up and down of the inner peripheral surface of the pin hole, are all formed flat, these surfaces may be curved surfaces having a radius of curvature large enough to be regarded as substantially flat surfaces.

According to the present invention, as set forth above, the substantially flat plate abutting surface of each rocker pin located closer to the outside of the plate and the substantially flat pin seating surface of the associated pin hole of the plate come into abutment with each other over a wide area. Besides, the convexly arcuate surfaces formed on both circumferential sides for the plate abutting surface of the rocker pin comes into abutment with the concavely arcuate surfaces formed on both circumferential sides of the pin seating surface. Consequently, rotation and wobbling of the rocker pin relative to the plate pin hole can be surely prevented. Thus, when such rocker pins and plates are assembled into a silent chain and used for the transmission of power, an efficient transmission of power can be attained.

Moreover, since the pin seating surface, of each pin hole for abutment with each rocker pin which is located closer to the outside of the plate, is formed generally flat, stress concentration is diminished on the contiguous portions from both circumferential ends of the pin seating surface to the concavely arcuate surfaces adjacent thereto. Further, since the concavely arcuate surfaces are interconnected to the concavely arcuate surfaces opposed to the rocker pin closer to the plate center by short and generally flat continuous surfaces, stress concentration is also diminished on the upper and lower central portions of the inner periphery of each pin hole and on the inwardly recessed portion of the plate. As a result, the fatigue strength of the plate is improved and the service life is prolonged.

We claim:

1. An improved silent chain including a multitude of plates, wherein each plate has first and second pin holes formed therethrough in symmetrical relationship with respect to a center of said plate, first and second rocker pins being inserted into each pin hole of said first and second pin holes of each plate of said plates in such a manner that convexly arcuate rocker surfaces of said first and second rocker pins are adjacent to each other to bendably interconnect said plates, wherein an improvement comprises:

each of said first and second rocker pins having a substantially flat plate abutting surface on a side opposite to said rocker surface thereof, wherein both circumferential ends of said plate abutting surface and both peripheral ends of said rocker surface are respectively interconnected by convexly arcuate surfaces;

a first concavely arcuate surface forming a first portion of an inner peripheral surface of each of said pin holes to permit a rocking motion of said rocker pin associated therewith, said first portion of said inner peripheral surface of each of said pin holes being opposed to a first one of said first and second rocker pins which is closer to said center of said plate than to an outer end of said plate;

a substantially flat pin seating surface forming a second portion of said inner peripheral surface of said pin hole which is opposed to a second one of said first and second rocker pins which is located closer to said outer end of said plate than to said center of said plate, wherein said pin seating surface comes into abutment with said plate abutting surface of said second one of said first and second rocker pins to prevent rotation thereof; and second and third concavely arcuate surfaces extending contiguously from both sides of said pin seating surface in a circumferential direction, wherein said second and third concavely arcuate surfaces have a contour conforming to said convexy arcuate surfaces of said second one of said first and second rocker pins; and two diametrically opposed, substantially flat connecting surfaces interconnecting said second and third concavely arcuate surfaces and-both circumferential ends of said first concavely arcuate surface, respectively, said flat connection surfaces being aligned in position with a center of each of said pin holes in a direction substantially parallel to said substantially flat pin seating surface.

2. An improved plate of a silent chain, wherein said plate has first and second pin holes formed symmetrically with respect to a center of said plate, with first and second rocker pins being inserted into each of said first and second pin holes in such a manner that respective convexly arcuate rocker surfaces of said first and second rocker pins are adjacent to each other, wherein an improvement comprises:

a first concavely arcuate surface forming a first portion of an inner peripheral surface of each of said first and second pin holes to permit a swiveling motion of said first and second rocker pins, respectively, wherein said first portion of said inner peripheral surface of each of said first and second pin holes is opposed to a first one of said first and second rocker pins which is closer to said center of said plate than to an outer end of said plate;

a substantially flat pin seating surface forming a second portion of said inner peripheral surface of each of said first and second pin holes which is opposed to a second one of said first and second rocker pins located closer to said outer end of said plate into which said first and second rocker pins have been than to said center of said plate, said pin seating surface coming into abutment with said second one of said first and second rocker pins to prevent said swiveling motion of said first and second rocker pins;

second and third concavely arcuate surfaces extending contiguously from both sides of said pin seating surface in a circumferential direction, said second and third concavely arcuate surfaces conforming to said second one of said first and second rocker pins; and two diametrically opposed, short, substantially fat connecting surfaces interconnecting said second and third concavely arcuate surfaces and both circumferential ends of said first concavely arcuate surface, respectively, said flat connection surfaces being aligned in position with a center of each of said pin holes in a direction substantially parallel to said substantially flat pin seating surfaces.

* * * * *